(12) United States Patent
Kwon et al.

(10) Patent No.: US 8,681,755 B2
(45) Date of Patent: Mar. 25, 2014

(54) METHOD AND APPARATUS FOR GENERATING DATA FRAME IN WIRELESS PERSONAL AREA NETWORK

(75) Inventors: Chang-yeul Kwon, Yongin-si (KR); Ji-sung Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1232 days.

(21) Appl. No.: 12/244,902

(22) Filed: Oct. 3, 2008

(65) Prior Publication Data

US 2009/0109944 A1    Apr. 30, 2009

Related U.S. Application Data

(60) Provisional application No. 60/983,659, filed on Oct. 30, 2007.

(30) Foreign Application Priority Data

Apr. 3, 2008 (KR) .......................... 10-2008-0031381

(51) Int. Cl.
*H04W 4/00* (2009.01)

(52) U.S. Cl.
USPC .......................................... 370/338; 370/329

(58) Field of Classification Search
USPC .......................................................... 370/338
See application file for complete search history.

(56) References Cited

U.S. PATENT DOCUMENTS

| 7,757,155 | B2 | 7/2010 | Lim et al. | |
|---|---|---|---|---|
| 2005/0152358 | A1* | 7/2005 | Giesberts et al. | 370/389 |
| 2006/0034317 | A1 | 2/2006 | Hong et al. | |
| 2006/0187852 | A1 | 8/2006 | Kwon et al. | |
| 2006/0218459 | A1* | 9/2006 | Hedberg | 714/752 |
| 2007/0104162 | A1* | 5/2007 | Kneckt et al. | 370/338 |
| 2007/0147284 | A1 | 6/2007 | Sammour et al. | |
| 2007/0230454 | A1* | 10/2007 | Ginzburg et al. | 370/389 |
| 2007/0258651 | A1 | 11/2007 | Shin et al. | |
| 2008/0130538 | A1* | 6/2008 | Raissinia et al. | 370/310 |
| 2008/0192774 | A1* | 8/2008 | Singh et al. | 370/473 |
| 2009/0040970 | A1* | 2/2009 | Ahmadi et al. | 370/329 |
| 2009/0074010 | A1 | 3/2009 | Kwon et al. | |

FOREIGN PATENT DOCUMENTS

| KR | 1020060009616 A | 2/2006 |
|---|---|---|
| KR | 1020060053671 A | 5/2006 |
| KR | 1020060111318 A | 10/2006 |
| KR | 100763207 B1 | 9/2007 |
| KR | 1020090029629 A | 3/2009 |

OTHER PUBLICATIONS

Communication from Korean Intellectual Property Office Dated Nov. 10, 2009.

(Continued)

*Primary Examiner* — Shaq Taha

(74) *Attorney, Agent, or Firm* — Sughrue Mion, PLLC

(57) ABSTRACT

Provided is a method of generating a data frame used in a wireless personal area network (WPAN). The method of generating a data frame used in a wireless personal area network (WPAN), the method including: generating a plurality of sub frames by using one or more MAC service data units (MSDUs); and generating sub headers including information about each sub frame; generating a PHY service data unit (PSDU) by using the plurality of sub frames, the sub headers, and a MAC header, wherein each sub frame includes a frame check sequence (FCS) field for detecting an error of a corresponding sub frame.

19 Claims, 6 Drawing Sheets

(56) References Cited

OTHER PUBLICATIONS

T. J. Ott, et al., "TCP Over ATM: ABR or UBR?", 1997, pp. 52-63, Bellcore, Morristown, NJ.

"Chapter 2. Protocols and Archtecture", Communication and Information Systems Lab, Apr. 12, 2000, pp. 1-23, Kaist.

Communication dated Dec. 17, 2009 issued by the Korean Intellectual Property Office in counterpart Korean Patent Application No. 10-2008-0071321.

* cited by examiner

FIG. 3
| mode index | Coding mode | Modulation | Code rate | | Raw data rate (Gb/s) |
|---|---|---|---|---|---|
| | | | MSB [7][6][5][4] | LSB [3][2][1][0] | |
| 0 | EEP | QPSK | 1/3 | | 0.952 |
| 1 | | QPSK | 2/3 | | 1.904 |
| 2 | | 16-QAM | 2/3 | | 3.807 |
| 3 | UEP | QPSK | 4/7 | 4/5 | 1.904 |
| 4 | | 16-QAM | 4/7 | 4/5 | 3.807 |
| 5 | MSB-only retransmission | QPSK | 1/3 | N/A | 0.952 |
| 6 | | QPSK | 2/3 | N/A | 1.904 |
FIG. 4A
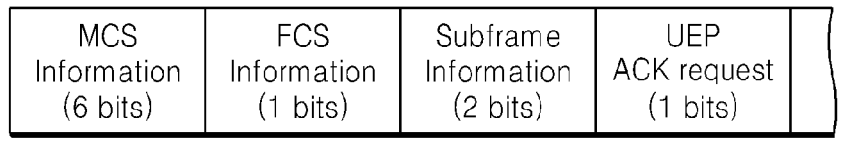
- MCS #3
- Use FCS
- MSB/LSB
- Request UEP ACK
FIG. 4B
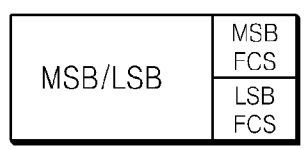

- MCS #1
- Use FCS
- MSB
- Follow MAC ACK policy

- MCS #0
- Use FCS
- LSB
- Follow MAC ACK policy

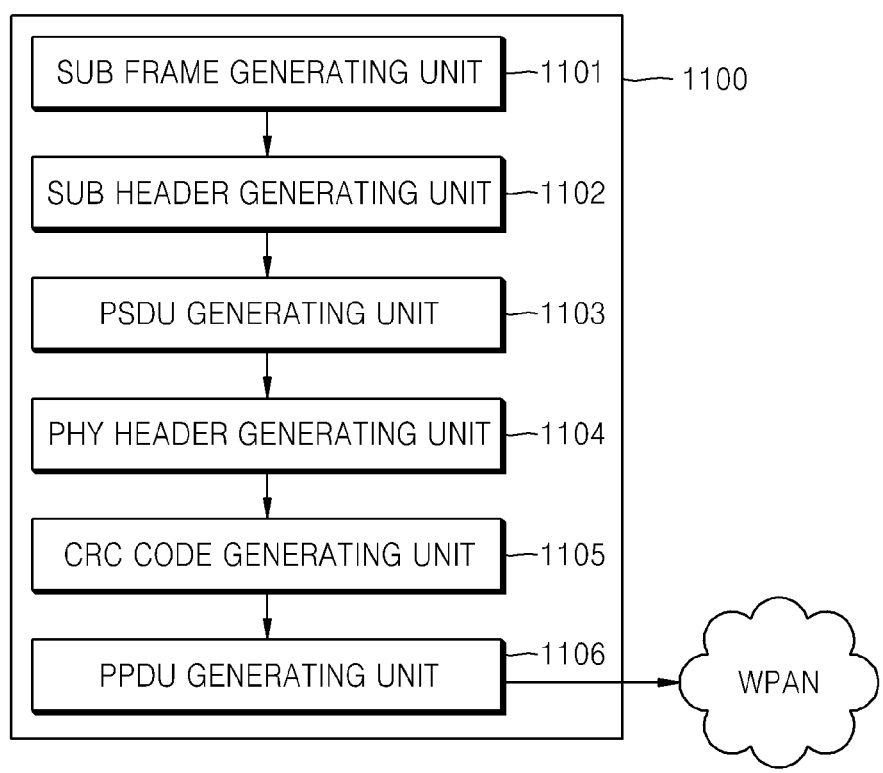

METHOD AND APPARATUS FOR GENERATING DATA FRAME IN WIRELESS PERSONAL AREA NETWORK

CROSS-REFERENCE TO RELATED PATENT APPLICATION

This application claims the benefit of U.S. Provisional Patent Application No. 60/983,659, filed on Oct. 30, 2007, in the U.S. Patent and Trademarks Office, and Korean Patent Application No. 10-2008-0031381, filed on Apr. 3, 2008, in the Korean Intellectual Property Office, the disclosure of which is incorporated herein in their entirety by reference.

BACKGROUND OF THE INVENTION

1. Field of the Invention

The present invention relates to a wireless personal area network (WPAN), and more particularly, to a method of generating a data frame used in the WPAN.

2. Description of the Related Art

A wireless personal area network (WPAN) is a network for interconnecting devices centered around a personal operating space using the wireless interconnections. The IEEE 802.15 working group (WG) has been organized to provide a communication standard for the personal operating space. The IEEE 802.15.3, which is one of four task groups (TGs) belonging to the IEEE 802.15 WG, has completed standardization of a high rate (HR)-WPAN used to transmit data at high speed.

In order to maximize the data transmission at full speed, the efficient usage of bandwidth and resources is critical for the overall WPAN. If a reception device receives the data frame from a transmission device in the WPAN, the reception device detects an error by using a Frame Check Sequence (FCS). If no error is detected, the reception device transmits an ACK to the transmission device to inform the transmission device that the data frame is received without an error.

When an error occurs in any parts of a Medium Access Control (MAC) service data unit (MSDU), the reception device does not transmit the ACK of a corresponding data frame to the transmission device, and thus the transmission device needs to retransmit all data frames, which insufficient usage of bandwidths and resources. Such retransmission could be fatal to quality of service (QoS) in a WPAN using a time division multiple access (TDMA). Accordingly, when an error occurs in data that is relatively less important than other data, retransmission of all data frames results in insufficient usage of a limited channel time.

BRIEF DESCRIPTION OF THE DRAWINGS

The above and other features and advantages of the present invention will become more apparent by describing in detail exemplary embodiments thereof with reference to the attached drawings in which:

FIG. 3 is a modulation and coding scheme (MCS) table according to an embodiment of the present invention;

FIGS. 4A and 4B illustrate sub header and sub frame structures according to an embodiment of the present invention;

FIG. 9 illustrates an ACK frame structure according to an embodiment of the present invention; and FIG. 10 is a block diagram of an apparatus for generating a data frame according to an embodiment of the present invention.

DETAILED DESCRIPTION OF THE INVENTION

Figure 1:
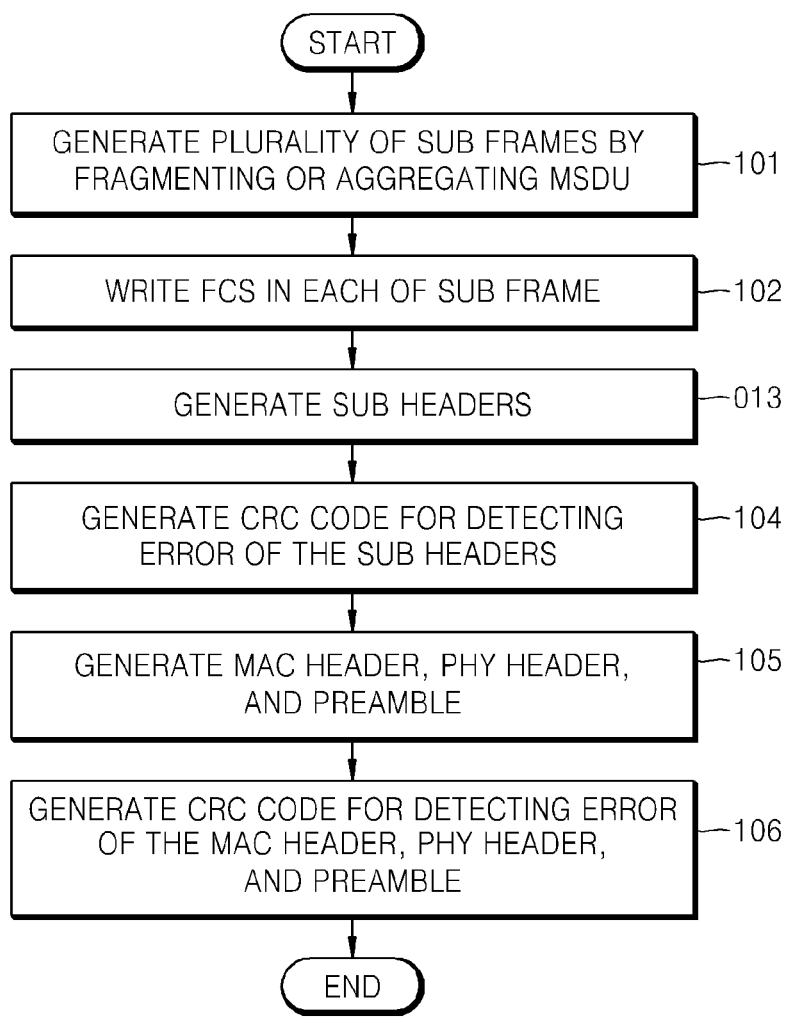
FIG. 1 is a flowchart illustrating a method of generating a data frame according to an embodiment of the present invention.

The present invention provides an apparatus and method for generating a data frame in order to efficiently use a channel time allocated to devices in a wireless network environment, including a Wireless Personal Area Network (WPAN) and other wireless network solutions. In accordance with an exemplary aspect of the present invention, there is provided a method of generating a data frame used in a wireless personal area network (WPAN), the method comprising: generating a plurality of sub frames by using one or more MAC service data units (MSDUs); and generating sub headers including information about each sub frame; generating a PHY service data unit (PSDU) by using the plurality of sub frames, the sub headers, and a MAC header, wherein each sub frame includes a frame check sequence (FCS) field for detecting an error of a corresponding sub frame.

As described in further detail below, the generating of the plurality of sub frames may comprise: using first type bits and second type bits extracted from the one or more MDSUs and generating the plurality of sub frames including a sub frame containing the first type bits, a sub frame containing the second type bits, and a sub frame containing both the first type bits and the second type bits, wherein the sub headers include fields indicating a type of bits included in a corresponding sub frame.

The sub frame containing both the first and second type bits may include separate fields to which FCSs for independently detecting an error from the first and second type bits are written.

The generating of the PSDU may comprise: generating a cyclic redundancy check (CRC) code for detecting an error of the sub headers; and combining the plurality of sub frames, the sub headers, and the CRC code with the MAC header.

The sub headers may include a field indicating whether an independent ACK is requested with regard to the first and second type bits of a corresponding sub frame.

The method may further comprise: generating a PHY protocol data unit (PPDU) by applying an MCS yielding a lower data rate than the plurality of sub frames to a PHY header, the sub headers, and the MAC header.

If a corresponding sub frame is one of fragments of a single MSDU, the sub headers may include a field to which an identifier of the MSDU is written, and a field to which information about a sequence of the plurality of sub frames of the fragments of the MSDU may be written.

The method may further comprise: generating the PHY header including a field indicating whether the sub headers are included in the data frame.

The method may further comprise: generating a CRC code for detecting an error of a preamble, the PHY header, and the MAC header; and generating a PPDU by using the CRC code and the PSDU.

The information about the MCS applied to a corresponding sub frame may be written to the sub headers.

According to another aspect of the present invention, there is provided a computer-readable recording medium having embodied thereon a computer program for executing the method above.

According to another aspect of the present invention, there is provided an apparatus for generating a data frame used in a WPAN, the apparatus comprising: a sub frame generating unit generating a plurality of sub frames by using one or more MSDUs; and a sub header generating unit generating sub headers including information about each sub frame; a PSDU generating unit generating a PSDU by using the plurality of sub frames, the sub headers, and a MAC header, wherein each sub frame includes an FCS field for detecting an error of a corresponding sub frame.

Hereinafter, the present invention will be described more fully with reference to the accompanying drawings, in which exemplary embodiments of the invention are shown.

FIG. 1 is a flowchart illustrating a method of generating a data frame according to an embodiment of the present invention. Referring to FIG. 1, a plurality of sub frames can be generated by fragmenting or aggregating a media access control (MAC) service data unit (MSDU) (operation 101). In more detail, several sub frames can be generated from a single MSDU, and a single sub frame can be generated by aggregating several MSDUs.

If the MSDU is data compressed by using a compression algorithm such as MPEG or JPEG, all bits are of equal importance. However, if the MSDU is non-compressed data such as RGB data, information included in each bit may be of different importance. For example, upper 4 bits of 1 byte in the RGB data can have more important information than lower 4 bits thereof. Hereinafter, each byte of the MSDU may have more significant bits (MSB) and less significant bits (LSB). The upper percentage of 1 byte, which occupies the MSB, may depend on the type of data and an embodiment thereof. In this regard, bits of 1 byte other than the MSB may be all LSB.

In operation 101, the sub frames may be generated to include all of a sub frame containing the MSB, a sub frame containing the LSB, and a sub frame containing the MSB and the LSB. That is, three types of sub frames can be generated. Since the sub frames are of different importance, when an error occurs in the sub frames, a transmission side selects one of the sub frames that is to be retransmitted so that a channel time can be efficiently used.

A frame check sequence (FCS) can be written to each of the sub frames (operation 102). In accordance with an exemplary embodiment, since each sub frame includes a separate FCS field, when a single data frame is transmitted, a reception side can detect a sub frame where an error occurs, if the reception side informs the transmission side about the sub frame where the error occurs, and the transmission side can retransmit the sub frame where the error occurs, thereby efficiently using the channel time.

Sub headers of the sub frames are generated (operation 103). Information on the sub frames may be written to the sub headers. The sub headers will be described in detail later with reference to FIG. 2.

A cyclic redundancy check (CRC) code for detecting an error of the sub headers is generated (operation 104). If an error occurs in the sub headers, accurate data may not be obtained even by decoding the sub frames. Thus, if it is determined that the error occurs in the sub headers, the reception side does not decode the other sub headers in order to reduce the usage of resources and time.

A MAC header, a PHY header, and a preamble are generated (operation 105).

The CRC code for detecting an error of the MAC header, the PHY header, and the preamble are generated (operation 106). If an error occurs in the MAC header, the PHY header, or the preamble, the reception side does not decode the remaining part in order to reduce the usage of resources and time.

Meanwhile, when a MAC layer transmits a MAC protocol data unit (MPDU) (=a PHY service data unit (PSDU) to a PHY layer, a modulation and coding scheme (MCS) with regard to a data frame is determined, and the PHY layer performs modulation and coding according to the MCS. A data rate can vary depending on the MCS. In general, since a low data rate reduces the probability of an error, the MAC header, the PHY header, the preamble, and the sub headers may apply the MCS that yields a lower data rate than the sub frames. Configuration and generation of the data frame according to an exemplary embodiment of the present invention can be implemented in a variety of manners, including the other wireless communications environment, without departing from the scope of the present invention.

Figure 2:
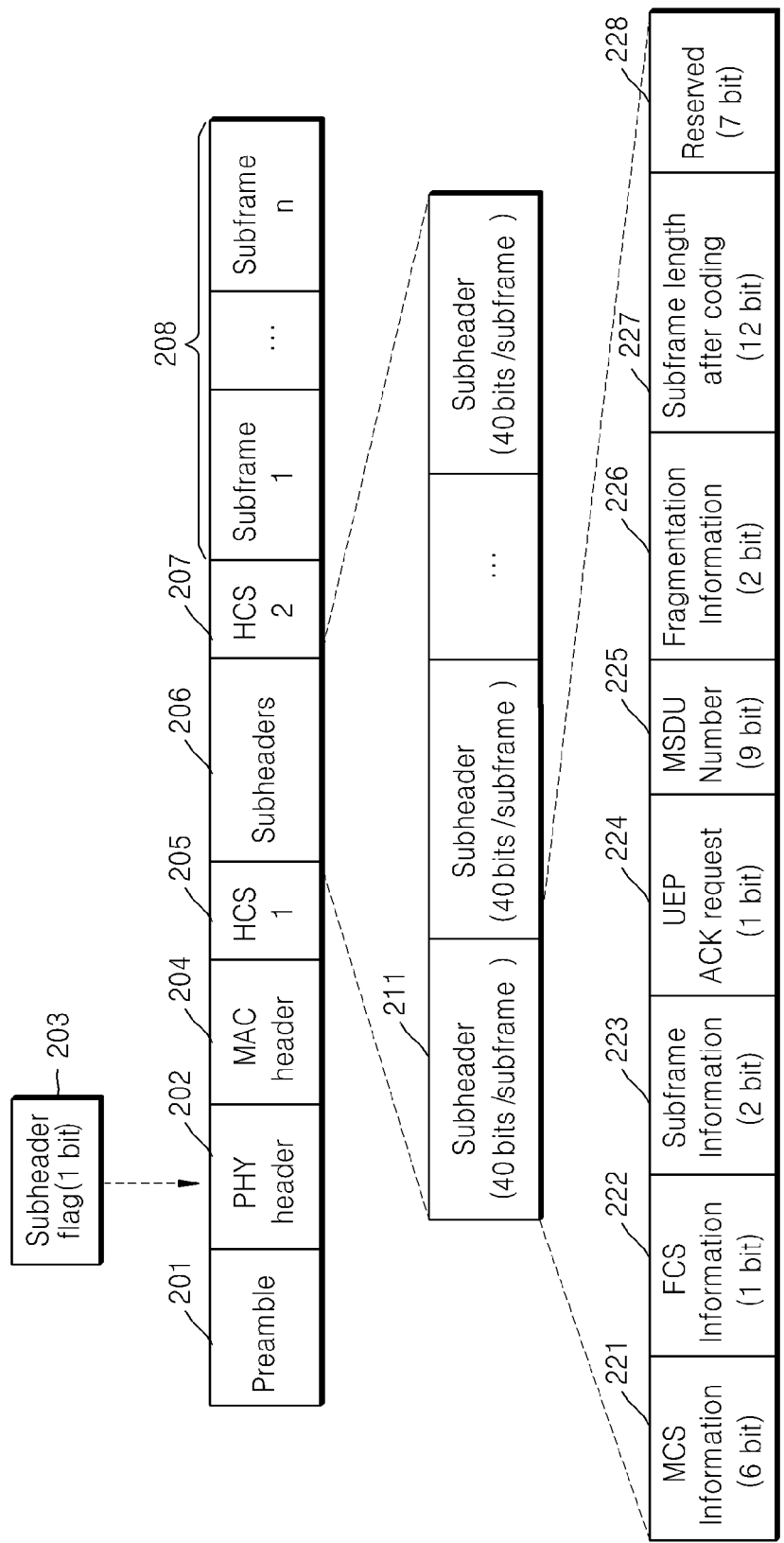
FIG. 2 illustrates a data frame structure according to an embodiment of the present invention.

FIG. 2 illustrates a data frame structure according to an embodiment of the present invention. Referring to FIG. 2, the data frame of the present embodiment comprises a preamble 201, a PHY header 202, a MAC header 204, a header check sequence (HCS) 1 205, sub headers 206, a HCS 2 207, and sub frames 208.

The PHY header 202 includes a sub header flag 203 indicating whether the data frame includes the sub headers 206.

The HCS 1 205 is a field for writing an HCS that is a CRC code for detecting an error of the preamble 201, the PHY header 202, and the MAC header 204. The HCS 2 207 is a field for writing an HCS that is a CRC code for detecting an error of the sub headers 206.

Meanwhile, a sub header constituting the sub headers 206 may comprise an MCS information field 221, a FCS information field 222, a sub frame information field 223, an unequal error protection (UEP) ACK request field 224, an MSDU number field 225, a fragmentation information field 226, a sub frame length after coding field 227, and a reserved field 228.

The MCS information field 221 includes information regarding an MCS that has been applied to the data frame. The information can be an index indicating a specific MCS. WPAN devices must have a table matching the index and the MCS. The table is shown in FIG. 3.

The FCS information field 222 includes information on whether an FCS is included in a corresponding sub frame. When FCS information is set to 1, if a corresponding sub frame includes both an MSB and LSB, the corresponding sub frame includes separate FCSs that can independently detect an error of the MSB and the LSB.

The sub frame information field 223 includes information regarding bits of a corresponding sub frame. In more detail, as described above, since a sub frame is generated by using an MSB and LSB extracted from an MSDU, the sub frame information field 223 indicates that the corresponding sub frame can include the MSB, the LSB, or both.

The UEP ACK request field 224 includes information on whether to request ACK according to the UEP. The ACK according to the UEP is that if a corresponding sub frame includes both the MSB and LSB, a reception side informs a transmission side about whether an error occurs in the MSB and LSB. The UEP ACK may make it possible to control quality of service (QoS) when an error occurs in the LSB since the transmission side does not retransmit a corresponding LSB according to the communication environment but retransmits the MSB. Therefore, in an exemplary aspect of the present embodiment, although it is provided that the above information is written to the UEP ACK request field 224 of the sub header 211, the information can be written to the MAC header 204.

Meanwhile, if a corresponding sub frame is one of fragments of the MSDU, an identifier of the MSDU is written to the MSDU number field 225, and information on a sequence of the corresponding sub frame of fragments is written to the fragmentation information field 226. In the present embodiment, 4 bits may be allocated to the fragmentation information field 226 to indicate the corresponding sub frame, a first fragment or a last fragment, or one of other fragments of the MSDU.

The sub frame length after coding field 227 includes information regarding the length of a corresponding sub frame. The reserved field 228 is used to write additional information in the future.

In the present embodiment, although a specific bit number is allocated to each field, it will be obvious to one of ordinary skill in the art that the bit number can vary according to various embodiments.

FIG. 3 is a modulation and coding scheme (MCS) table according to an embodiment of the present invention.

As described above, information about an MCS that is to be applied to a sub frame may be written to the MCS information field 221.

For example, if 2 (000010) is written to the MCS information field 221 (MCS #2), a corresponding sub frame is modulated in 16-quadrature amplitude modulation (QAM), and is coded in 2/3.

If 3 (000011) is written to the MCS information field 221, a corresponding sub frame is modulated by quadrature phase shift keying (QPSK), an MSB is coded in 4/7, and an LSB is coded in 4/5. 4/7 means that 7 bits are output by adding a 3 bit redundancy to a 4 bit input. 4/5 means that 5 bits are output by adding a 1 bit redundancy to a 4 bit input. Since a large redundancy makes error correction easy, it may be easier to correct an error of the MSB than the LSB, thereby better protecting the MSB from error.

FIGS. 4A and 4B illustrate sub header and sub frame structures according to an embodiment of the present invention. Referring to FIG. 4A, the sub frame of the present embodiment may use MCS #3, and an FCS, include an MSB and LS, and requests UEP ACK.

Referring to FIG. 4B, the sub frame, which includes the MSB and LSB and uses the FCS, may have MSB FCS for detecting an error of the MSB and LSB FCS for detecting an error of the LSB. The sub frame is modulated by QPSK according to the MCS #3 (see FIG. 3). The MSB is coded in 4/7. The LSB is coded in 4/5.

Since the sub frame requests the UEP ACK, a reception side will inform a transmission side about whether an error occurs in the MSB and LSB.

Figure 5A:
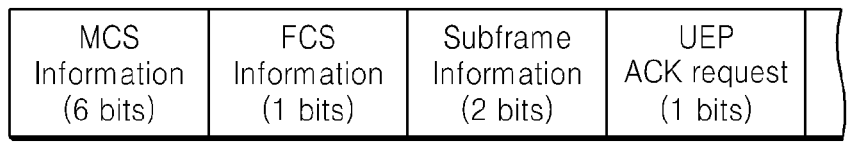
FIGS. 5A and 5B illustrate sub header and sub frame structures according to another embodiment of the present invention.
Figure 5B:
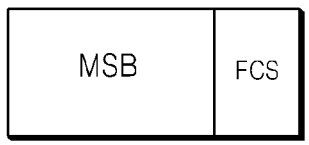

FIGS. 5A and 5B illustrate sub header and sub frame structures according to another embodiment of the present invention. Referring to FIG. 5A, the sub frame of the present embodiment can use MCS #1, and an FCS, include an MSB, does not request UEP ACK, and follows an MAC ACK policy.

Referring to FIG. 5B, the sub frame may include the MSB, and the FCS for detecting an error of the MSB. The sub frame is modulated by QPSK according to the MCS #1 (see FIG. 3) and is coded in 2/3.

Since the sub frame may not request the UEP ACK, a reception side may proceed with an ACK process according to the ACK policy included in a MAC header of a data frame.

Figure 6A:
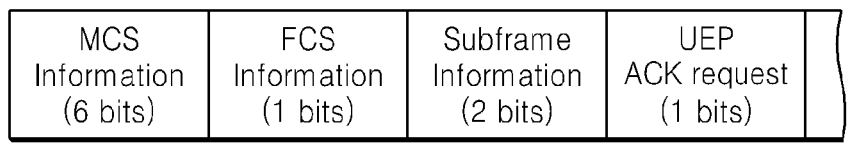
FIGS. 6A and 6B illustrate sub header and sub frame structures according to another embodiment of the present invention.
Figure 6B:
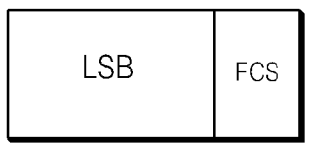

FIGS. 6A and 6B illustrate sub header and sub frame structures according to another embodiment of the present invention. Referring to FIG. 6A, the sub frame of the present embodiment can use MCS #0, use an FCS, include an LSB, may not request UEP ACK, and follows an MAC ACK policy.

Referring to FIG. 6B, the sub frame includes the LSB, and the FCS for detecting an error of the LSB. The sub frame is modulated by QPSK according to the MCS #0 (see FIG. 3) and is coded in 1/3.

Since the sub frame does not request the UEP ACK, a reception side may proceed with an ACK process according to the ACK policy included in a MAC header of a data frame.

Figure 7A:
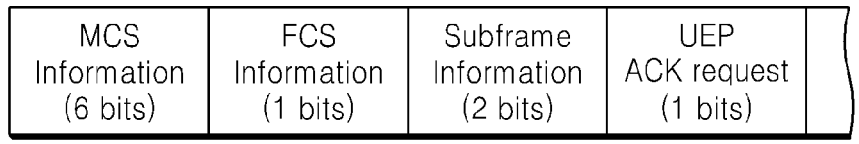
FIGS. 7A and 7B illustrate sub header and sub frame structures according to another embodiment of the present invention.
Figure 7B:
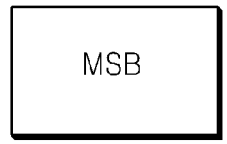

FIGS. 7A and 7B illustrate sub header and sub frame structures according to another embodiment of the present invention. Referring to FIG. 7A, the sub frame of the present embodiment may use MCS #2, may not use an FCS, include an MSB, may not request UEP ACK, and follow an MAC ACK policy.

Referring to FIG. 7B, the sub frame can include the MSB, and not include the FCS for detecting an error of the MSB. The sub frame is modulated in 16-QAM according to the MCS #2 (see FIG. 3) and is coded in 2/3.

Since the sub frame does not request the UEP ACK, a reception side proceeds with an ACK process according to the ACK policy included in a MAC header of a data frame.

Figure 8A:
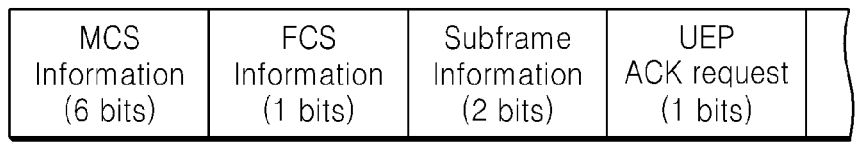
FIGS. 8A and 8B illustrate sub header and sub frame structures according to another embodiment of the present invention.
Figure 8B:
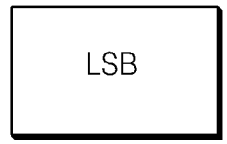

FIGS. 8A and 8B illustrate sub header and sub frame structures according to another embodiment of the present invention. Referring to FIG. 8A, the sub frame of the present embodiment uses MCS #0, does not use an FCS, includes an LSB, does not request UEP ACK, and follows an MAC ACK policy.

Referring to FIG. 8B, the sub frame includes the LSB, and does not include the FCS for detecting an error of the LSB. The sub frame is modulated by QPSK according to the MCS #0 (see FIG. 3) and is coded in 1/3.

Since the sub frame does not request the UEP ACK, a reception side proceeds with an ACK process according to the ACK policy included in a MAC header of a data frame.

FIG. 9 illustrates an ACK frame structure according to an embodiment of the present invention. Referring to FIG. 9, a transmission side requests an UEP ACK with regard to a plurality of sub frames. A reception side can inform the transmission side about whether an error occurs in the plurality of sub frames by using a single ACK frame. Furthermore, the reception side can independently inform the transmission side about whether an error occurs in each of MSB and LSB of the plurality of sub frames. A transmission device retransmits an MSB in which an error occurs instead of an LSB in which an error occurs, thereby more efficiently using a channel time allocated to the transmission device.

FIG. 10 is a block diagram of an apparatus 1000 for generating a data frame according to an embodiment of the present invention. Referring to FIG. 10, the apparatus 1000 (generally a WPAN device) for generating the data frame of the present embodiment may comprise a sub frame generating unit 1001, a sub header generating unit 1002, a PSDU generating unit 1003, a PHY header generating unit 1004, a CRC code generating unit 1005, and a presentation protocol data unit (PPDU) generating unit 1006.

The sub frame generating unit 1001 may generate a plurality of sub frames by fragmenting or aggregating the MSDU.

For example, the sub frame generating unit 1001 can extract an MSB and LSB from the MSDU, and generate the plurality of sub frames including all of a sub frame containing the MSB, a sub frame containing the LSB, and a sub frame containing both the MSB and the LSB.

Each sub frame may include an FCS field for detecting an error of a corresponding sub frame.

The sub header generating unit 1002 may generate sub headers to which information on the plurality of sub frames is written. The sub headers include the fields shown in FIG. 2.

The PSDU generating unit 1003 may generate a CRC code for detecting an error in the plurality of sub frames, combine the plurality of sub frames, the sub headers, and the CRC code, and generate a PSDU.

The PHY header generating unit 1004 can generate a PHY header used in a physical layer. The PHY header may include a flag indicating whether the data frame includes the sub headers.

The CRC code generating unit 1004 may generate the CRC code for detecting an error of a preamble, the PHY header, and a MAC header.

The PPDU generating unit 1006 may generate a PPDU by using the PSDU, the PHY header, and the CRC code generated by the CRC code generating unit 1004. The PDDU generating unit 1006 can perform modulation and coding with regard to the data frame, and apply an MCS yielding a lower data rate than the plurality of sub frames to the preamble, the PHY header, and the MAC header. Thus, the probability of an error that occurs in the preamble, the PHY header, and the MAC header may be lower than the plurality of sub frames.

The embodiments of the present invention can be written as computer programs and can be implemented in general-use digital computers that execute the programs using a computer readable recording medium. Examples of the computer readable recording medium can include magnetic storage media (e.g., ROM, floppy disks, hard disks, etc.), optical recording media (e.g., CD-ROMs, or DVDs), and storage media. Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

A transmission device of a WPAN can selectively retransmit a sub frame in which an error occurs among a plurality of sub frames included in a single data frame.

Furthermore, when data is decompressed, since each sub frame can be of different importance, the transmission device can actively determine a sub frame that is to be retransmitted according to conditions, and efficiently use a limited channel time. Furthermore, when a single sub frame includes relatively more significant data and relatively less significant data, since an FCS with regard to each piece of data is written, a reception side can independently detect an error with regard to each piece of data. The high rate WPAN in accordance with an exemplary aspect of the present invention may be applicable to various applications as a wire or cable replacement technology for home entertainment systems capable of transmitting and receiving high definition video and audio files.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Obviously, it is possible in light of the above teachings to implement the present invention in numerous modifications and variations. For example, the method in accordance with an aspect of the present invention may be applicable to a wired network environment even though an aspect of the present invention is described in the context of a wireless network. Therefore, the scope of the invention is defined not by the detailed description of the invention but by the appended claims, and all differences within the scope will be construed as being included in the present invention.

What is claimed is:

1. A method of generating a data frame used in a wireless network, the method comprising:
   generating a plurality of sub frames by using one or more Media Access Control (MAC) Service Data Units (MSDUs);
   generating sub headers including information about the plurality of sub frames; and
   generating a PHY Service Data Unit (PSDU) by using the plurality of sub frames, the sub headers, and a MAC header,
   wherein each sub frame of the plurality of frames includes a Frame Check Sequence (FCS) field for detecting an error of a corresponding sub frame, and
   wherein the sub headers are not included in the plurality of sub frames,
   wherein the generating of the plurality of sub frames comprises: using first type bits and second type bits extracted from the one or more MSDUs and generating the plurality of sub frames including a sub frame containing the first type bits, a sub frame containing the second type bits, and a sub frame containing both the first type bits and the second type bits,
   wherein the sub headers include fields indicating a type of bits included in a corresponding sub frame, and
   wherein the sub headers include a field indicating whether an independent ACK is requested with regard to the first and second type bits of a corresponding sub frame.

2. The method of claim 1, wherein the sub frame containing both the first and second type bits includes separate fields to which FCSs for independently detecting an error from the first and second type bits are written.

3. The method of claim 1, wherein the generating the PSDU comprises:
   generating a cyclic redundancy check (CRC) code for detecting an error of the sub headers; and combining the plurality of sub frames, the sub headers, and the CRC code with the MAC header.

4. The method of claim 1, further comprising: generating a PHY protocol data unit (PPDU) by applying a Modulation and Coding Scheme (MCS) yielding a lower data rate than the plurality of sub frames to a PHY header, the sub headers, and the MAC header.

5. The method of claim 1, wherein, if a corresponding sub frame is one of fragments of a single MSDU, the sub headers include a field to which an identifier of the MSDU is written, and a field to which information about a sequence of the plurality of sub frames of the fragments of the MSDU is written.

6. The method of claim 1, further comprising: generating a PHY header including a field indicating whether the sub headers are included in the data frame.

7. The method of claim 1, further comprising:
generating a cyclic redundancy check (CRC) code for detecting an error of a preamble, a PHY header, and the MAC header; and
generating a PHY protocol data unit (PPDU) by using the CRC code and the PSDU.

8. The method of claim 4, wherein information about the MCS applied to a corresponding sub frame is written to the sub headers.

9. The method of claim 1, wherein the sub headers include a field in which information about a length of a corresponding sub frame is written, and wherein the wireless network comprises a wireless personal area network (WPAN).

10. An apparatus in a wireless personal area network (WPAN), the apparatus comprising:
a memory; and
a processor comprising:
a sub frame generating unit generating a plurality of sub frames by using one or more MSDUs; and
a sub header generating unit generating sub headers including information about the plurality of sub frames;
a PSDU generating unit generating a PSDU by using the plurality of sub frames, the sub headers, and a MAC header,
wherein each sub frame of the plurality of sub frames includes an FCS field for detecting an error of a corresponding sub frame, and
wherein the sub headers are not included in the plurality of sub frames,
wherein the sub frame generating unit uses first type bits and second type bits extracted from the one or more MSDUs, and generates the plurality of sub frames including a sub frame containing the first type bits, a sub frame containing the second type bits, and a sub frame containing both the first type bits and the second type bits,
wherein the sub headers include fields indicating a type of bits included in a corresponding sub frame, and
wherein the sub headers include a field indicating whether an independent ACK is requested with regard to the first and second type bits of a corresponding sub frame.

11. The apparatus of claim 10, wherein the sub frame containing both the first and second type bits includes separates fields to which FCSs for independently detecting an error from the first and second type bits are written.

12. The apparatus of claim 10, wherein the PSDU generating unit generates a CRC code for detecting an error of the sub headers, and combines the plurality of sub frames, the sub headers, and the CRC code with the MAC header.

13. The apparatus of claim 10, further comprising: a PDDU generating unit generating a PPDU by applying an MCS yielding a lower data rate than the plurality of sub frames to a PHY header, the sub headers, and the MAC header.

14. The apparatus of claim 10, wherein, if a sub frame is one of fragments of a single MSDU, the sub headers include a field to which an identifier of the MSDU is written, and a field to which information about a sequence of the plurality of sub frames of the fragments of the MSDU is written.

15. The apparatus of claim 10, further comprising: a PHY header generating unit generating a PHY header including a field indicating whether the sub headers are included in the data frame.

16. The apparatus of claim 10, further comprising:
a CRC code generating unit generating a CRC code for detecting an error of a preamble, a PHY header, and the MAC header; and
a PPDU generating unit generating a PPDU by using the CRC code and the PSDU.

17. The apparatus of claim 10, wherein information about the MCS applied to a corresponding sub frame is written to the sub headers.

18. The apparatus of claim 10, wherein the sub headers include a field to which information about a length of a corresponding sub frame is written.

19. A non-transitory computer-readable recording medium having embodied thereon a computer program for executing the method of claim 1.

* * * * *